US012715088B2

(12) United States Patent
Pitney

(10) Patent No.: US 12,715,088 B2
(45) Date of Patent: Aug. 25, 2026

(54) MAGNETIC BALL JOINT PRESS APPARATUS

(71) Applicant: HUSKY CORPORATION, Pacific, MO (US)

(72) Inventor: Paul Pitney, Wildwood, MO (US)

(73) Assignee: HUSKY CORPORATION, Pacific, MO (US)

( * ) Notice: Subject to any disclaimer, the term of this patent is extended or adjusted under 35 U.S.C. 154(b) by 379 days.

(21) Appl. No.: 18/497,239

(22) Filed: Oct. 30, 2023

(65) Prior Publication Data

US 2024/0139920 A1 May 2, 2024

Related U.S. Application Data

(60) Provisional application No. 63/475,330, filed on Oct. 31, 2022.

(51) Int. Cl.
*B25B 27/02* (2006.01)
*B25B 27/00* (2006.01)

(52) U.S. Cl.
CPC ........ *B25B 27/023* (2013.01); *B25B 27/0035* (2013.01)

(58) Field of Classification Search
CPC ...... B60G 2204/41; B60G 7/005; B62D 7/16; B62D 7/163; B62D 7/166; Y10T 29/53852; B25B 27/023; B25B 11/002; B25B 23/12
See application file for complete search history.

(56) References Cited

U.S. PATENT DOCUMENTS 5,259,278 A * 11/1993 Leas ...................... B25B 23/00 81/125
6,145,723 A * 11/2000 Gupta ...................... B25C 1/08 227/139
7,669,305 B1 * 3/2010 Lionberg ................ B25B 27/02 29/257

* cited by examiner

*Primary Examiner* — Jason L Vaughan
(74) *Attorney, Agent, or Firm* — Sandberg Phoenix & von Gontard, P.C.

(57) ABSTRACT

A magnetic ball joint press apparatus has first and second receivers at opposite ends of a clamp of the apparatus that employ permanent magnets to hold respective first and second ball joint adapters to the opposite ends of the apparatus. The permanent magnets holding the ball joint adapters to the opposite ends of the clamp of the apparatus significantly facilitate use of the apparatus.

20 Claims, 8 Drawing Sheets

MAGNETIC BALL JOINT PRESS APPARATUS

RELATED PATENT APPLICATIONS

This application claims the benefit of the Oct. 31, 2022, filing date of provisional patent application Ser. No. 63/475,330, which is incorporated herein by reference.

BACKGROUND

This application is directed to the improved construction and functioning of a ball joint press apparatus.

A conventional ball joint press apparatus is basically comprised of a "C" shaped clamp or a C-clamp having opposite first and second ends. The first end of the clamp is configured as a receiver for a ball joint adapter.

A jack screw or an adjustment screw is provided at the opposite, second end of the C-shaped configuration of the clamp. The jack screw is screw threaded through the second end of the clamp. The position of the jack screw on the clamp is adjustable relative to the clamp in response to rotating the jack screw in opposite directions on the clamp.

Various shapes and sizes of ball joint adapters are known, with each ball joint adapter having a configuration for receiving and holding a portion of a ball joint having a particular shape and size on the adapter. The first end of the clamp of the ball joint press is configured to receive and hold a selected ball joint adapter.

The jack screw has an end that opposes the ball joint adapter received at the first end of the clamp. The end of the jack screw is configured for attachment to a second ball joint adapter.

Operation of the jack screw by turning the jack screw in opposite directions on the clamp adjustably positions the second ball joint adapter on the jack screw toward and away from the first ball joint adapter on the clamp.

In use of a conventional ball joint press apparatus of the type described above, it is often difficult to maintain connections between the first and second ball joint adapters on the respective first end of the clamp and the end of the jack screw. With first and second ball joint adapters attached to the first end of the clamp and the end of the jack screw, positioning a ball joint between the first and second ball joint adapters often results in the first and second ball joint adapters separating from and falling from the clamp and the jack screw.

SUMMARY

The above described shortcomings of a conventional ball joint press are overcome by the magnetic ball joint press apparatus of this disclosure.

The ball joint press of this disclosure also comprises a C-clamp that is similar in construction to the C-clamp of a conventional ball joint press. The C-clamp of this disclosure has a length with a clamp first end and a clamp second end at the opposite ends of the C-clamp length.

A first receiver for a first ball joint adapter is provided at the first end of the clamp. The first receiver has a structural configuration for receiving and holding a first ball joint adapter on the first end of the clamp. The first ball joint adapter received on the first receiver is separate from the first receiver and is not mechanically connected to the first receiver.

There is a source of a magnetic field on the first receiver at the clamp first end. The source of a magnetic field is operable to produce a magnetic field at the first receiver. When a first ball joint adapter is positioned on the first receiver, the magnetic field holds the first ball joint adapter to the first receiver.

There is also a second source of a magnetic field on the first receiver. The second source of a magnetic field is also operable to produce a magnetic field at the first receiver that also holds the first ball joint adapter on the first receiver. The first source of a magnetic field and the second source of a magnetic field on the first receiver are positioned on opposite sides of the first receiver and on opposite sides of a first ball joint adapter positioned on the first receiver. The first source of a magnetic field and the second source of a magnetic field both hold the first ball joint adapter on the first receiver and are the sole means of holding the first ball joint adapter on the first receiver.

The first source of a magnetic field is a first permanent magnet. The second source of a magnetic field is a second permanent magnet. When a first ball joint adapter is positioned on the first receiver at the first end of the clamp, the first and second permanent magnets are positioned on opposite sides of the ball joint adapter.

There is a second receiver on the clamp's second end. The second receiver also has a structural configuration that receives and holds a second ball joint adapter on the second receiver.

A jack screw or an adjustment screw is provided at the opposite, second end of the C-shaped configuration of the clamp. The jack screw has a straight length between opposite first and second ends of the jack screw with external screw threads along the length of the jack screw. The jack screw is screw threaded through the second end of a clamp. The jack screw is movable relative to the clamp in response to rotating the jackscrew in opposite directions on the clamp.

The jack screw has an end that opposes the ball joint adapter held on the first receiver at the first end of the clamp. This end of the jack screw is configured as the second receiver of the clamp that receives and holds a second ball joint adapter. The second ball joint adapter held on the end of the jack screw opposes the first ball joint adapter held on the first end of the clamp.

Operation of the jack screw by turning the jack screw in opposite directions on the clamp adjustably positions the second ball joint adapter on the end of the jack screw toward and away from the first ball joint adapter on the first end of the clamp.

There is a third source of a magnetic field on the second receiver on the jack screw. The third source of a magnetic field is operable to produce a magnetic field at the second receiver. When a second ball joint adapter is positioned on the second receiver, the magnetic field holds the second ball joint adapter positioned on the second receiver to the second receiver.

There is also a fourth source of a magnetic field on the second receiver. The fourth source of a magnetic field is also operable to produce a magnetic field at the second receiver that holds the second ball joint adapter to the second receiver. The third source of a magnetic field and the fourth source of a magnetic field on the second receiver are positioned on opposite sides of the second receiver and on opposite sides of a second ball joint adapter positioned on the second receiver. The third source of a magnetic field and the fourth source of a magnetic field both hold the second ball joint adapter on the second receiver and are the sole means of holding the second ball joint adapter on the second receiver.

The third source of a magnetic field is a third permanent magnet. The fourth source of a magnetic field is a fourth permanent magnet. When a second ball joint adapter is positioned on the second receiver at the end of the jack screw, the third and fourth permanent magnets are positioned on opposite sides of the second ball joint adapter.

DETAILED DESCRIPTION

Figure 1:
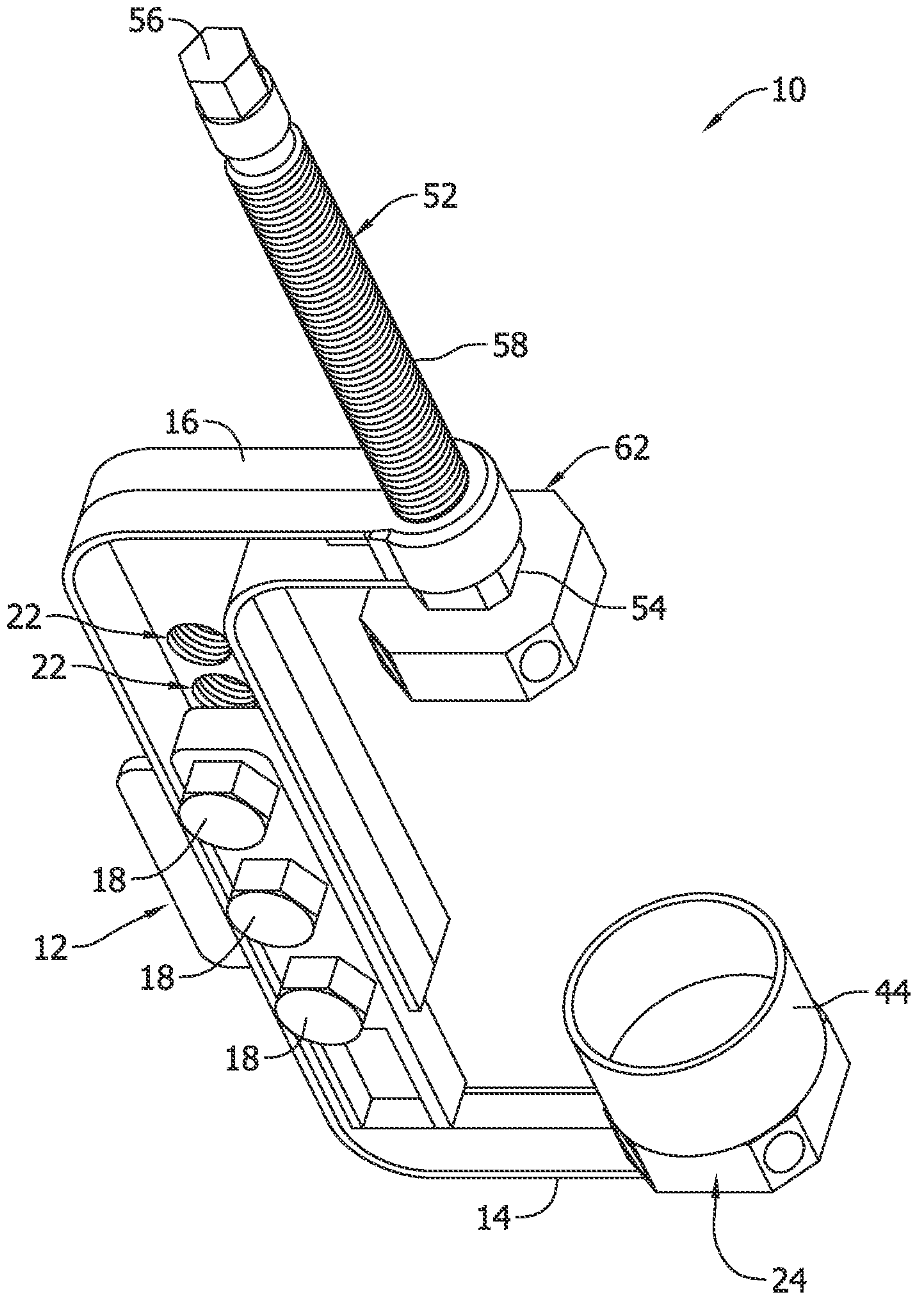
FIG. 1 is a representation of a top perspective view of the magnetic ball joint press apparatus of this disclosure.
Figure 2:
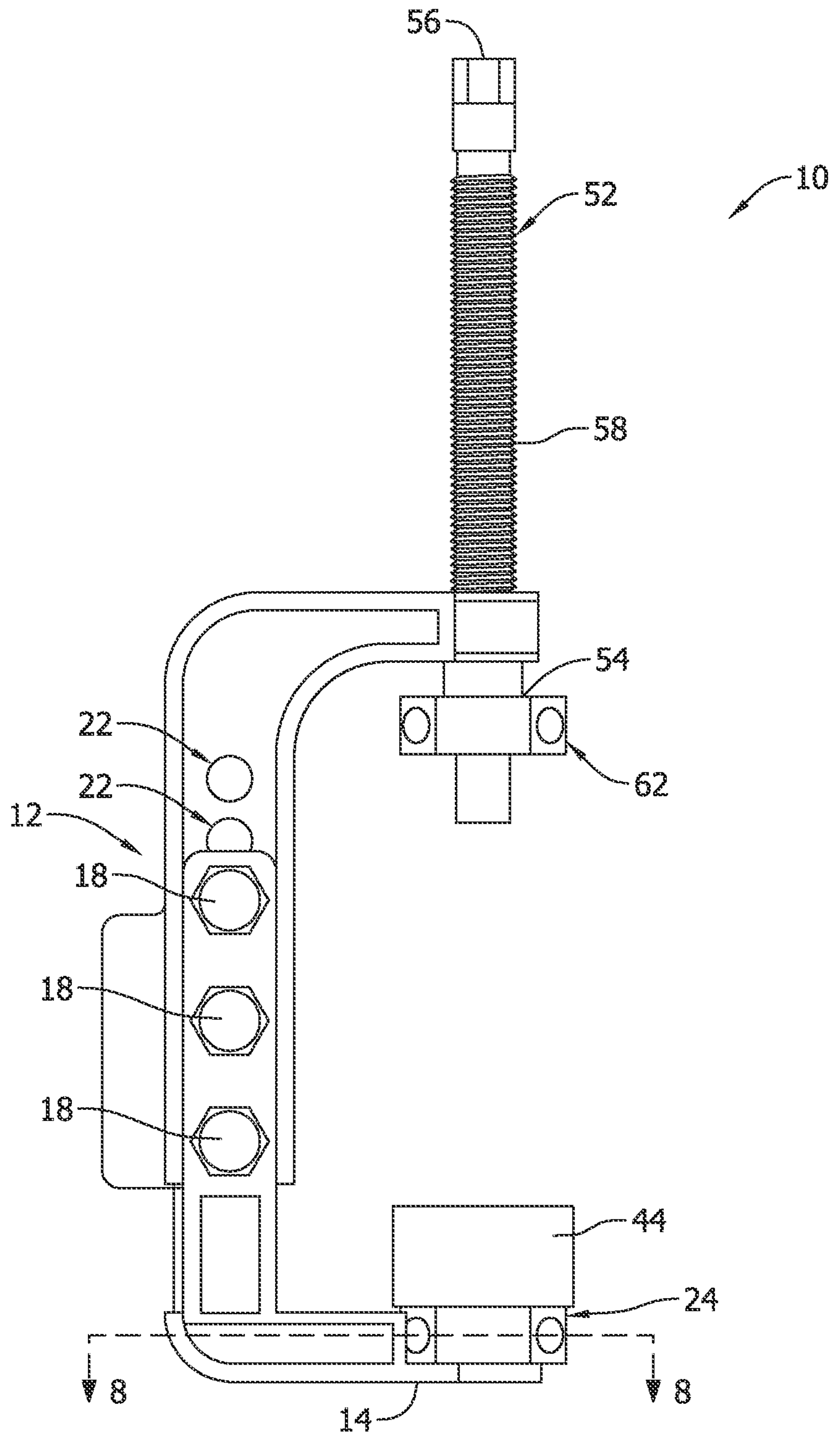
FIG. 2 is a representation of a front elevation view of the apparatus of FIG. 1, with the rear elevation view of the apparatus being a mirror image thereof.
Figure 3:
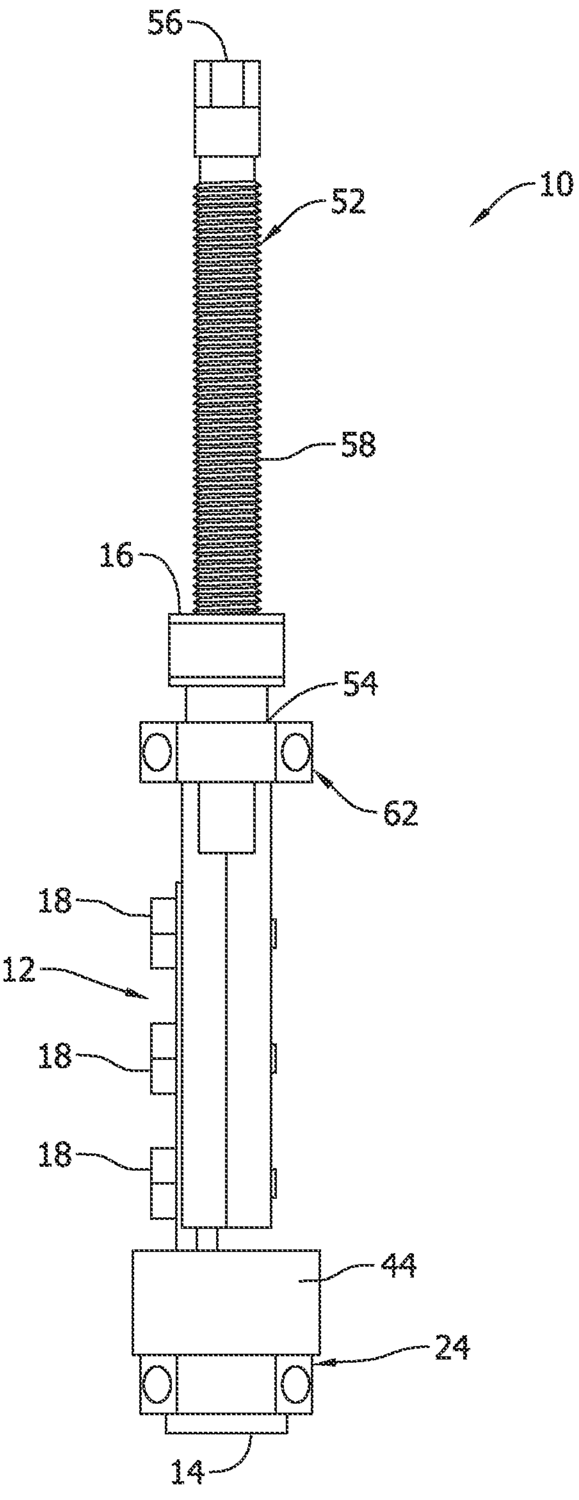
FIG. 3 is a representation of a right-side elevation view of the apparatus of FIG. 2.
Figure 4:
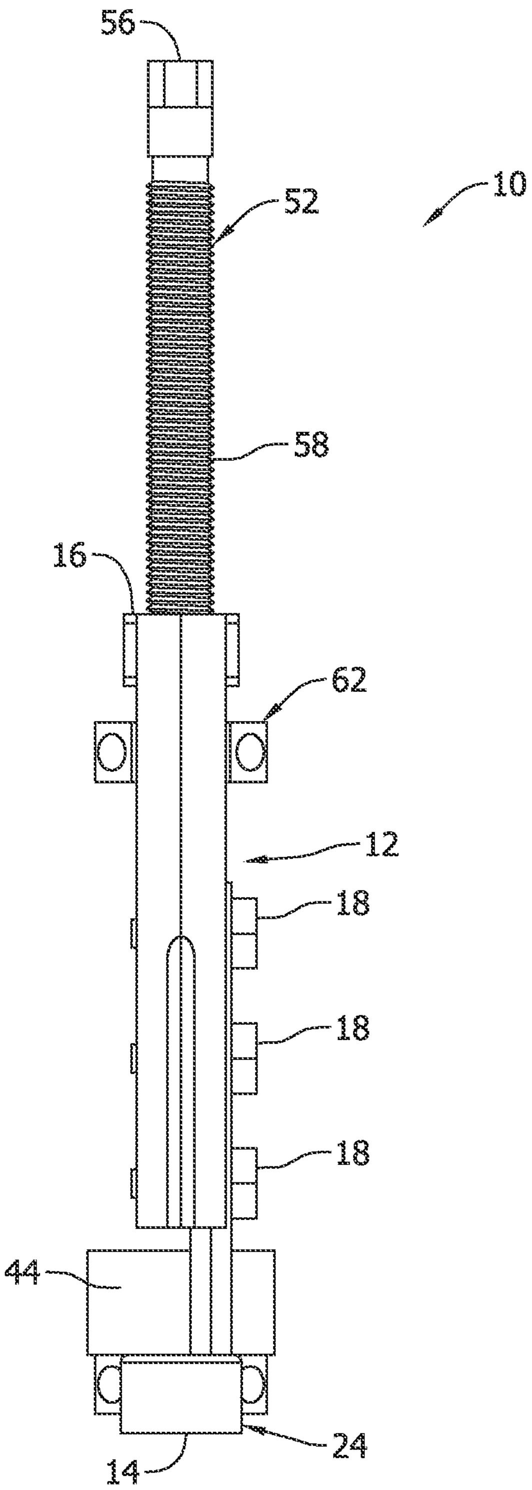
FIG. 4 is a representation of a left side elevation view of the apparatus of FIG. 2.
Figure 5A:
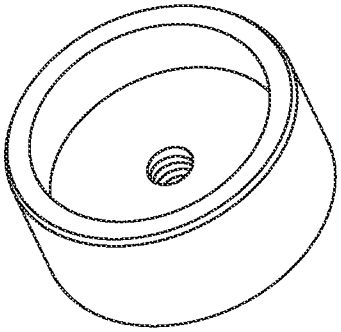
FIGS. 5A-5F are representations of perspective views of ball joint adapters of the type employed with the apparatus of this disclosure.
Figure 5B:
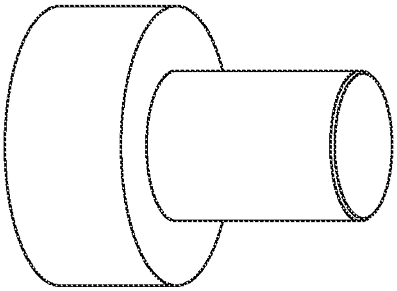
Figure 5C:
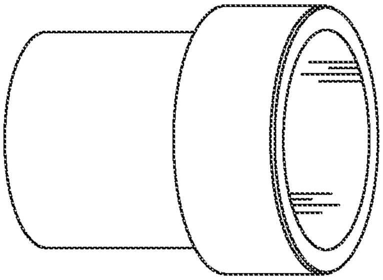
Figure 5D:
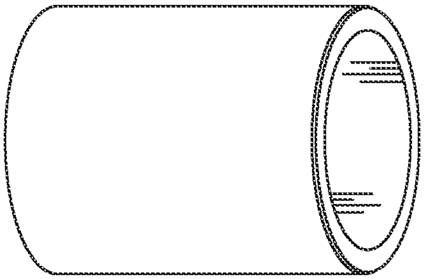
Figure 5E:
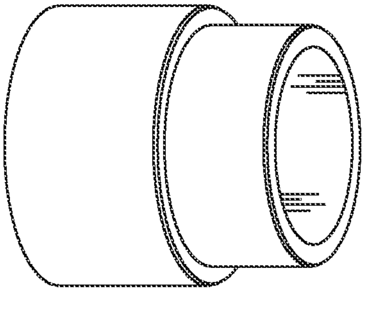
Figure 5F:
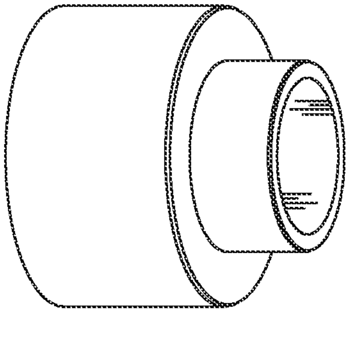

The magnetic ball joint press apparatus of this disclosure is constructed of materials that provide the apparatus with sufficient structural strength and with properties that enable the apparatus to function in the manner intended and as described herein. For example, the apparatus is constructed of ferrous, magnetic material such as steel, and more specifically 12L14 steel. Other equivalent types of materials can be employed in the construction of the magnetic ball joint press apparatus of this disclosure.

The magnetic ball joint press apparatus 10 of this disclosure is represented in FIGS. 1-4 as comprising a "C" shaped clamp or C-clamp 12. The "C" shaped configuration of the clamp 12 has a first end 14 at a bottom of the clamp configuration and a second end 16 at a top of the clamp configuration. The first end 14 of the clamp 12 is provided with a flat surface that enables the clamp to be supported on a separate flat surface in an upright orientation such as that represented in FIG. 2. As represented in FIGS. 1-4, the clamp 12 is constructed in two parts that are connected together by threaded fasteners 18 that screw into internally threaded holes 22. Providing a larger number of the internally threaded holes 22 on the two parts of the clamp 12 construction than the number of threaded fasteners 18 enables the two parts to be assembled together in a multiple of adjusted length configurations of the clamp 12.

Figure 8:
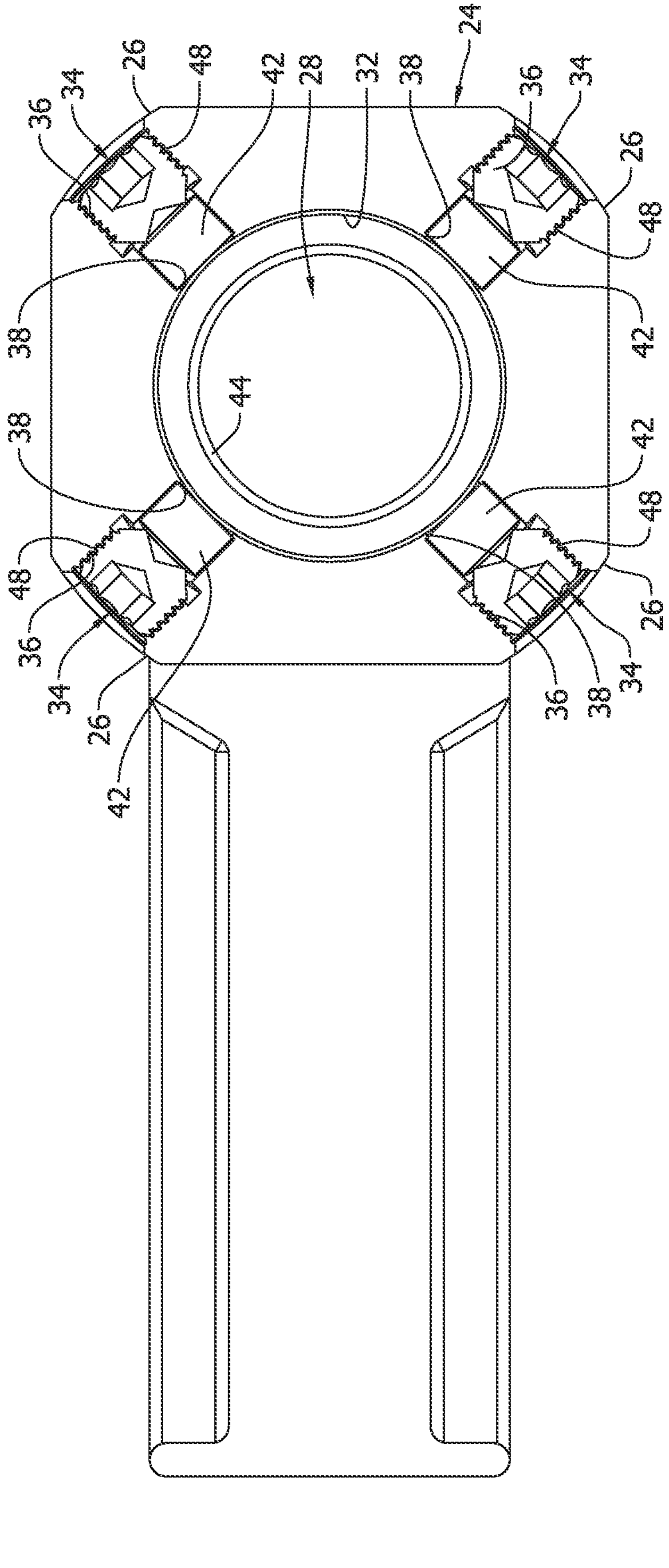
FIG. 8 is a representation of a cross section view of a bottom portion of the apparatus of FIG. 2 taken along line 8-8 of FIG. 2.

The first end 14 of the clamp 12 is constructed with a first receiver 24. The first receiver 24 has an exterior surface with a general polygonal configuration as represented in FIG. 8. The polygonal configuration of the exterior surface of the first receiver 24 is comprised of four surfaces 26 of equal area. Pairs of the surfaces 26 on opposite sides of the first receiver 24 are parallel and pairs of the surfaces 26 that are adjacent are perpendicular.

The first receiver 24 also has an opening or a center bore 28. The opening 28 is defined by a cylindrical interior surface 32 that surrounds the opening and is centered in the first receiver 24.

There are four cylindrical channels 34 that extend through the first receiver 24 from the exterior surfaces 26 to the opening 28. As represented in FIG. 8, portions of the channels 34 adjacent the exterior surfaces 26 have internal screw threads 36. Annular protrusions 38 extend from the first receiver 24 into the channels 34 where the channels 34 intersect with interior surface 32 surrounding the opening 28 in the first receiver 24.

There is a source of a magnetic field 42 in each of the channels 34. Each source of a magnetic field 42 is a permanent magnet having a cylindrical configuration. Each magnet 42 is dimensioned to slide through the channels 34 and abut against the protrusions 38 adjacent the opening 28 in the first receiver 24. FIG. 8 is a representation of four permanent magnets 42 with pairs of first and second permanent magnets 42 positioned on opposite sides of the opening 28. The plurality of permanent magnets 42 are spatially arranged around the opening 28 and create a magnetic field that extends into the opening 28. The magnetic field produced by the magnets 42 acts on and holds a first ball joint adapter 44 such is that represented in FIGS. 5A-5F in the opening 28 and to the first receiver 24.

As stated earlier, various shapes and sizes of ball joint adapters are known, with each ball joint adapter having a configuration for receiving and holding a portion of a ball joint having a particular shape and size on the adapter. FIGS. 5A-5F represent examples of various different types of ball joint adapters. FIGS. 5A-5F represent only a small example of the various shapes and sizes of ball joint adapters known. The first receiver 24 of the apparatus 10 is constructed to enable a selected ball joint adapter 44 of the various shapes and sizes of ball joint adapters known to be inserted into the opening 28 of the first receiver 24 and held in the opening 28 and to the first receiver 24 by the magnetic field produced by the plurality of permanent magnets 42 surrounding the opening 28.

There is a screw 48 such as a set screw in each of the screw threaded portions 36 of the channels 34. The set screws 48 are dimensioned to be screw threaded into the screw threaded portions 36 of the channels 34 and engage against the magnets 42 in the channels, pressing the magnets through the channels and into engagement with the protrusions 38. In this manner, the set screws 48 position the magnets 42 adjacent the opening 28 in the first receiver 24, with the protrusions 38 preventing the magnets 42 from extending into the opening 28.

Thus, with the set screws 48 positioning the magnets 42 in the channels 34 against the protrusions 38 and adjacent to the opening 28 in the first receiver 24, the magnetic fields produced by the magnets 42 hold a ball joint adapter 44 positioned in the opening 28 in the opening and to the first receiver 24. The ball joint adapter 44 is held in the opening 28 and to the first receiver 24 solely by the magnetic fields produced by the magnets 42. There is no mechanical connection between the ball joint adapter 44 and the first receiver 24.

There is a jack screw or adjustment screw 52 provided on the second end 16 of a clamp 12. The adjustment screw 52 has a straight length between opposite first 54 and second 56 ends of the adjustment screw. External screw threads 58 are provided along the length of the adjustment screw 52. The external screw threads 58 are screw threaded through mating internal screw threads in the second end 16 of the clamp 12. The mating screw threads enabled the adjustment screw 52 to be movable relative to the clamp 12 in response to rotating the adjustment screw 52 in opposite directions on the second end 16 of the clamp.

The first end 54 of the adjustments screw 52 is positioned by the clamp 12 opposing the first receiver 24 at the first end 14 of the clamp. There is a second receiver 62 connected to the first end 54 of the adjustment screw 52. The adjustment screw 52 thereby connects the second receiver 62 to the clamp second end 16. The second receiver 62 has a structural configuration substantially the same as that of the first receiver 24 represented in FIG. 8. Because the constructions of the first receiver 24 and the second receiver 62 are substantially the same, the construction of the second receiver 62 is described only generally herein.

The second receiver 62 has an exterior surface with a general polygonal configuration comprised of four surfaces 64 of equal area. Pairs of the surfaces 64 on opposite sides of the second receiver 62 are parallel and pairs of the surfaces 64 that are adjacent are perpendicular.

Figure 6:
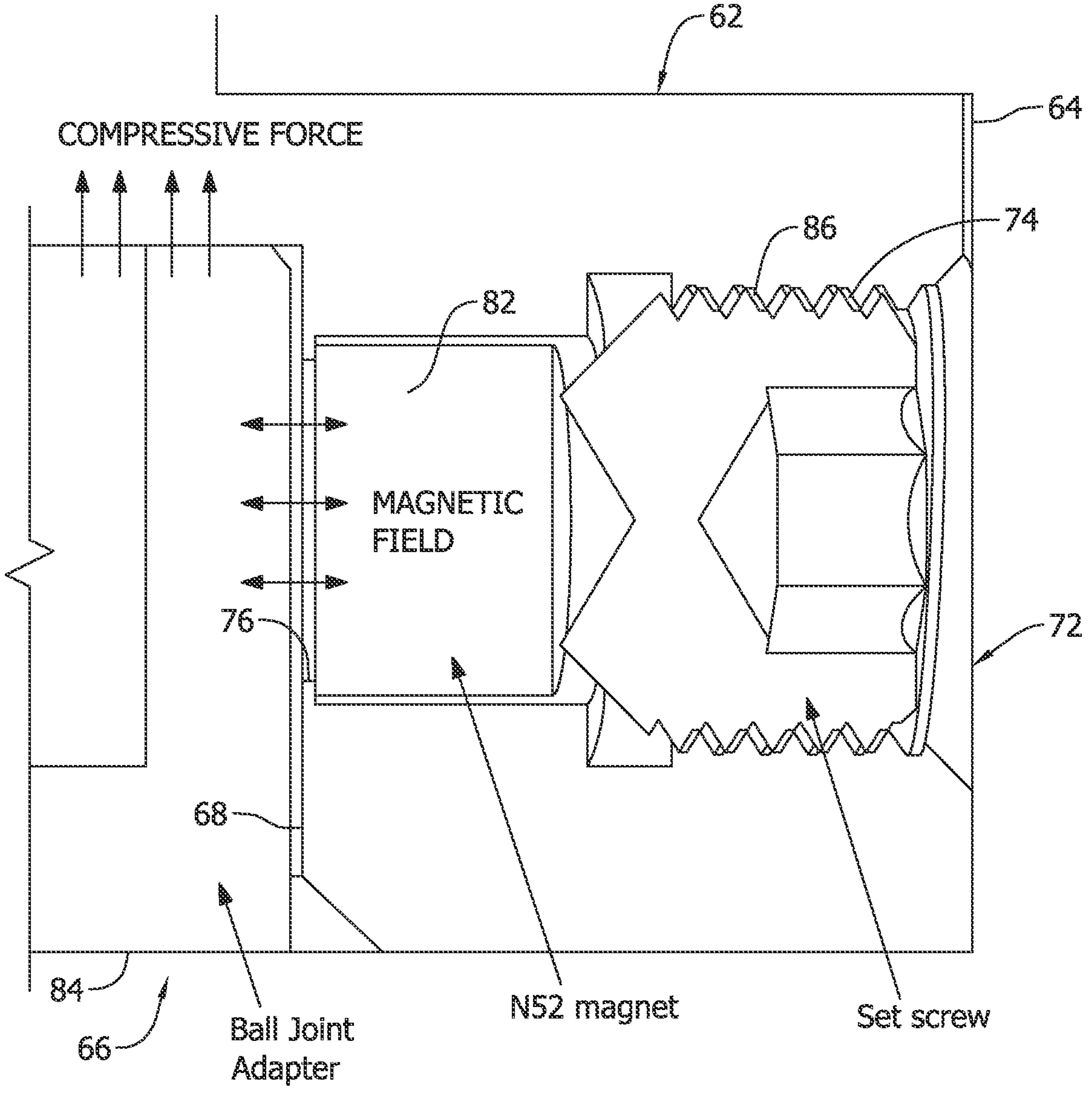
FIG. 6 is a representation of a partial cross section view of a top portion of the apparatus of FIG. 2.
Figure 7:
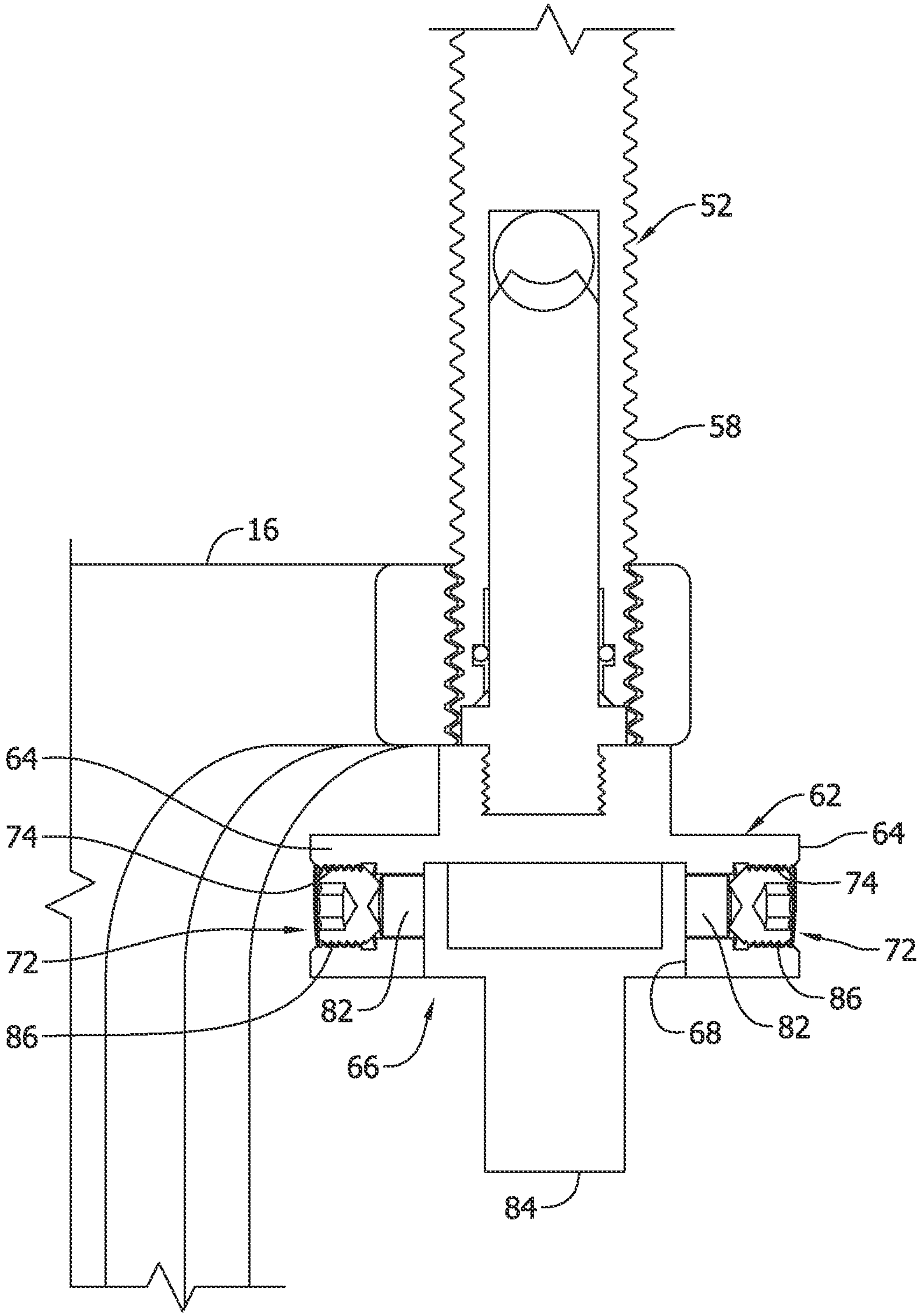
FIG. 7 is a representation of a partial enlarged view of the portion of the apparatus shown circled in FIG. 6.

The second receiver 62 also has an opening or a center bore 66 as represented in FIGS. 6 and 7. The opening 66 is defined by a cylindrical interior surface 68 that surrounds the opening and is centered in the second receiver 62.

There are four cylindrical channels 72 that extend through the second receiver 62 from the exterior surfaces 64 to the opening 66. As represented in FIGS. 6 and 7, portions of the channels 72 adjacent the exterior surfaces 64 have internal screw threads 74. Annular protrusions 76 extend from the second receiver 62 into the channels 72 where the channels intersect with the interior surface 68 surrounding the opening 66 in the second receiver 62.

There is a source of a magnetic field 82 in each of the channels 72. Each source of a magnetic field 82 is a permanent magnet having a cylindrical configuration. Each magnet 82 is dimensioned to slide through the channels 72 and abut against the protrusions 76 adjacent the opening 66 in the second receiver 62. The plurality of permanent magnets 82 are spatially arranged around the opening 66 and create a magnetic field that extends into the opening. The magnetic field produced by the magnets 82 acts on and holds a second ball joint adapter 84 such is that represented in FIGS. 5A-5F in the opening 66 and to the second receiver 62.

As with the first receiver 24 of the apparatus 10, the second receiver 62 is constructed to enable a selected ball joint adapter 84 of the various shapes and sizes of ball joint adapters known to be inserted into the opening 66 of the second receiver 62 and held in the opening 66 and to the second receiver 62 by the magnetic field produced by the plurality of permanent magnets 82 surrounding the opening 66. FIG. 7 is a representation of a pair of third and fourth permanent magnets 82 positioned on opposite sides of the opening 66 of the four permanent magnets 82 spatially arranged around the opening.

There is a screw 86 such as a set screw in each of the screw threaded portions 74 of the channels 72. The set screws 86 position the magnets 82 adjacent the opening 66 in the second receiver 62, with the protrusions 76 preventing the magnets 82 from extending into the opening 66.

Thus, with the set screws 86 positioning the magnets 82 in the channels 72 against the protrusions 76 and adjacent to the opening 66 in the second receiver 62, the magnetic fields produced by the magnets 82 hold a ball joint adapter 84 positioned in the opening 66 in the opening and to the second receiver 62. The ball joint adapter 84 is held in the opening 66 and to the second receiver 62 solely by the magnetic fields produced by the magnets 82. There is no mechanical connection between the ball joint adapter 84 and the second receiver 62.

Thus the disadvantages and shortcomings associated with conventional ball joint press apparatus are overcome by the magnetic ball joint press apparatus of this disclosure. The magnetic fields produced by the plurality of permanent magnets on the first receiver 24 and second receiver 62 prevent first ball joint adapter 44 and second ball joint adapter 84 from falling from the receivers in use of the ball joint press. The construction of the magnetic ball joint press apparatus 10 of this disclosure thereby significantly facilitates the use of the apparatus in pressing a ball joint into a cross arm of a suspension or removing a ball joint from a suspension.

Although the magnetic ball joint press apparatus of this disclosure has been described above by referring to a specific embodiment of the apparatus and its functioning, it should be understood that the features, functioning and advantages of the magnetic ball joint press apparatus discussed above are intended to be illustrative and not limiting, and that the scope of protection of the invention is defined only by the following claims.

The invention claimed is:

1. A ball joint press apparatus comprising:

a clamp, the clamp having a length with a clamp first end and a clamp second end at opposite ends of the length;

a first receiver at the clamp first end, the first receiver having a structural configuration that receives a first ball joint adapter on the first receiver;

an opening in the first receiver, the opening being configured to receive the first ball joint adapter in the opening; and a source of a magnetic field on the first receiver, the source of a magnetic field being operable to produce a magnetic field at the first receiver that extends into the opening in the first receiver and to the first ball joint adapter in the opening and holds the first ball joint adapter on the first receiver.

2. The ball joint press apparatus of claim 1, further comprising:

the first ball joint adapter is a separate part from the first receiver and is not mechanically connected to the first receiver.

3. The ball joint press apparatus of claim 2, further comprising:

a second receiver at the clamp second end, the second receiver having a structural configuration that receives a second ball joint adapter on the second receiver.

4. The ball joint press apparatus of claim 3, further comprising:

the second ball joint adapter is a separate part from the second receiver and is not mechanically connected to the second receiver.

5. The ball joint press apparatus of claim 3, further comprising:

a source of a magnetic field on the second receiver, the source of a magnetic field on the second receiver being operable to produce a magnetic field at the second receiver that holds the second ball joint adapter on the second receiver.

6. The ball joint press apparatus of claim 5, further comprising:

the source of a magnetic field on the first receiver is a permanent magnet; and the source of a magnetic field on the second receiver is a permanent magnet.

7. The ball joint press apparatus of claim 5, further comprising:

the source of a magnetic field on the first receiver is a plurality of permanent magnets on the first receiver; and the source of a magnetic field on the second receiver is a plurality of permanent magnets on the second receiver.

8. The ball joint press apparatus of claim 5, further comprising:

an adjustment screw on the clamp second end; and the second receiver being on the adjustment screw.

9. The ball joint press apparatus of claim 8, further comprising:

an opening in the second receiver, the opening being configured to receive the second ball joint adapter in the opening in the second receiver;

a channel through the second receiver from an exterior surface of the second receiver to the opening in the second receiver; and a permanent magnet in the channel, the permanent magnet being operable to produce a magnetic field at the second receiver that holds the second ball joint adapter in the opening on the second receiver.

10. A ball joint press apparatus comprising:

a clamp, the clamp having a length with a C-shaped configuration and a clamp first end and a clamp second end at opposite ends of the length;

a first receiver at the clamp first end, the first receiver having a structural configuration that receives a first ball joint adapter on the first receiver;

an opening in the first receiver, the opening being configured to receive the first ball joint adapter in the opening;

a channel through the first receiver from an exterior surface of the first receiver to the opening in the first receiver; and a permanent magnet in the channel, the permanent magnet being operable to produce a magnetic field at the first receiver that holds the first ball joint adapter in the opening on the first receiver.

11. The ball joint press apparatus of claim 10, further comprising:

a screw in the channel between the exterior surface of the first receiver and the permanent magnet in the channel, the screw in the channel being operable to hold the permanent magnet in the channel.

12. The ball joint press apparatus of claim 11, further comprising:

a projection projecting from the first receiver into the channel, the projection being positioned in the channel between the permanent magnet in the channel and the opening in the first receiver.

13. The ball joint press apparatus of claim 10, further comprising:

the channel through the first receiver being one channel of a plurality of channels extending through the first receiver from the exterior surface of the first receiver to the opening in the first receiver; and the permanent magnet being one of a plurality of permanent magnets received in the plurality of channels in the first receiver, the plurality of permanent magnets being operable to produce magnetic fields at the first receiver that hold the first ball joint adapter in the opening in the first receiver.

14. The ball joint press apparatus of claim 10, further comprising:

an adjustment screw on the clamp second end;

a second receiver on the adjustment screw, the second receiver having a structural configuration that receives a second ball joint adapter on the second receiver;

an opening in the second receiver, the opening being configured to receive a second ball joint adapter in the opening;

a channel through the second receiver from an exterior surface of the second receiver to the opening in the second receiver; and a permanent magnet in the channel, the permanent magnet being operable to produce a magnetic field at the second receiver that holds the second ball joint adapter in the opening on the second receiver.

15. The ball joint press apparatus of claim 14, further comprising:

a screw in the channel through the second receiver between the exterior surface of the second receiver and the permanent magnet in the channel, the screw in the channel being operable to hold the permanent magnet in the channel.

16. The ball joint press apparatus of claim 15, further comprising:

a projection projecting from the second receiver into the channel through the second receiver, the projection being positioned in the channel between the permanent magnet in the channel and the opening in the second receiver.

17. The ball joint press apparatus of claim 14, further comprising:

the channel through the second receiver being one channel of a plurality of channels extending through the second receiver from the exterior surface of the second receiver to the opening in the second receiver; and the permanent magnet being one of a plurality of permanent magnets received in the plurality of channels in the second receiver, the plurality of permanent magnets being operable to produce magnetic fields at the second receiver that hold the second ball joint adapter in the opening in the second receiver.

18. A ball joint press apparatus comprising:

a clamp, the clamp having a length with a clamp first end and a clamp second end at opposite ends of the length;

a first receiver at the clamp first end, the first receiver having a structural configuration that receives a first ball joint adapter on the first receiver;

an opening in the first receiver, the opening being configured to receive the first ball joint adapter in the opening in the first receiver;

a source of a magnetic field on the first receiver, the source of a magnetic field being operable to produce a magnetic field at the first receiver that holds the first ball joint adapter in the opening in the first receiver;

an adjustment screw on the clamp second end;

a second receiver on the adjustment screw, the second receiver having a structural configuration that receives a second ball joint adapter on the second receiver;

an opening in the second receiver, the opening in the second receiver being configured to receive the second ball joint adapter in the opening in the second receiver; and a source of a magnetic field on the second receiver, the source of a magnetic field on the second receiver being operable to produce a magnetic field at the second receiver that holds the second ball joint adapter in the opening in the second receiver.

19. The ball joint press apparatus of claim 18, further comprising:

the source of a magnetic field on the first receiver being a permanent magnet on the first receiver; and the source of a magnetic field on the second receiver being a permanent magnet on the second receiver.

20. The ball joint press apparatus of claim 18, further comprising:

the source of a magnetic field on the first receiver being a plurality of permanent magnets on the first receiver spatially arranged around the first ball joint adapter on the first receiver; and the source of a magnetic field on the second receiver being a plurality of permanent magnets on the second receiver spatially arranged around the second ball joint adapter on the second receiver.

* * * * *